United States Patent [19]

Twitchell et al.

[11] Patent Number: 5,291,428
[45] Date of Patent: Mar. 1, 1994

[54] APPARATUS FOR REDUCING SPURIOUS FREQUENCY COMPONENTS IN THE OUTPUT SIGNAL OF A DIRECT DIGITAL SYNTHESIZER

[75] Inventors: Edwin R. Twitchell, Quincy, Ill.;
Daniel B. Talbot, Hudson, Mass.

[73] Assignee: Harris Corporation, Melbourne, Fla.

[21] Appl. No.: 25,076

[22] Filed: Mar. 2, 1993

[51] Int. Cl.⁵ ............................................. G06J 1/00
[52] U.S. Cl. ................................. 364/602; 364/721; 328/14
[58] Field of Search ............... 364/602, 721, 607, 718; 328/14

[56] References Cited

U.S. PATENT DOCUMENTS

| | | | |
|---|---|---|---|
| 4,652,832 | 3/1987 | Jasper | 364/721 |
| 4,901,265 | 2/1990 | Kerr et al. | 364/721 |
| 4,951,237 | 8/1990 | Essenwanger | 364/721 |
| 5,010,506 | 4/1991 | Hrncirik | 364/721 |

*Primary Examiner*—Tan V. Mai
*Attorney, Agent, or Firm*—Tarolli, Sundheim & Covell

[57] ABSTRACT

Spurious frequency components from the output signal of a direct digital synthesizer are reduced with minimum degradation of the fundamental frequency of the output signal. The synthesizer has a phase accumulator for receiving digital multibit modulation data words from a source, a periodic wave function converter for converting the modulation data words into digital waveform data words and a digital-to-analog converter for converting the digital waveform data words into an analog signal which serves as the output signal. The output signal has a frequency and waveform dictated by the modulation data words. Reduction of spurious frequency components is achieved by generating a dither waveform representing a band limited waveform. The dither waveform is summed with the modulation data words prior to application to the wave function converter to provide a dither modulated analog output signal. A sampled dither signal is combined with the dither modulated analog output signal in such a manner that the dither waveform is cancelled from the fundamental waveform of the analog output signal.

17 Claims, 2 Drawing Sheets

APPARATUS FOR REDUCING SPURIOUS FREQUENCY COMPONENTS IN THE OUTPUT SIGNAL OF A DIRECT DIGITAL SYNTHESIZER

FIELD OF THE INVENTION

The present invention relates to the art of direct digital synthesizers and, more particularly, to improvements relating to reducing spurious frequency components in the output signal of such a synthesizer with minimum degradation of the fundamental waveform of the output signal.

DESCRIPTION OF THE PRIOR ART

Direct digital synthesizers (DDS), sometimes referred to as DDS frequency synthesizers, are known for digitally generating signals, such as frequency modulated signals. DDS frequency synthesizers typically include a phase accumulator for receiving digital multibit modulation data words from a source, such as a computer or the like. Such synthesizers also include a periodic wave function converter, such as a sine converter, for converting the modulation data words into digital waveform data words. The digital waveform data words are then supplied to a digital-to-analog converter which converts the data words into an analog output signal which serves as the output signal of the DDS frequency synthesizer. This analog output signal contains spurious frequency components produced by nonlinearities in the DDS frequency synthesizer. For example, it is known that in any digital-to-analog conversion process an error takes place during the translation of the digital waveform data word into discrete analog amplitude levels by the digital-to-analog converter (DAC).

It is known that the spurious frequency components may be reduced by employing low level, broad band signals for amplitude dithering the least significant bit (LSB) of the digital-to-analog converter (DAC). Such a technique is disclosed in the U.S. Pat. to R. J. Kerr et al. U.S. Pat. No. 4,901,265. That technique, while reducing spurious amplitude, tends to increase the system noise energy over a broad band.

The prior art also includes the U.S. Patent to S. C. Jasper U.S. Pat. No. 4,652,832 which discloses a system employing phase dithering. A digital dither signal is added to the output of an accumulator prior to conversion of the data by a periodic wave function converter (such as a sine or cosine converter). This patent, however, does not additionally show a DAC conversion process but, instead, tends to limit the size of ROM tables for providing wave and function conversions by quantitizing the sum output of the dither generator.

SUMMARY OF THE INVENTION

It is an object of the present invention to provide spurious reduction, with minimal increase in noise, from the desired signal with either phase or frequency dithering rather than amplitude dithering.

It is still a further object of the present invention to provide dithering with a band limited dither waveform permitting eventual cancellation of the dither from the fundamental waveform of the desired output signal while dither remains on any spurious signals caused by nonlinearities in the frequency synthesizer providing reduced spurious amplitudes.

The present invention contemplates the provision of a direct digital synthesizer for producing frequency signals and which has a phase accumulator for receiving digital multibit modulation data words from a source, a periodic wave function converter for converting the modulation data words into digital waveform data words and a digital-to-analog converter for converting the digital waveform data words into an analog signal serving as the output signal of the frequency synthesizer. The output signal exhibits frequency and waveform as dictated by the digital modulation data words. Also, the output signal contains spurious frequency components resulting from nonlinearities in the signal processing operation of the direct digital synthesizer.

In accordance with the present invention, reduction of spurious frequency components from the frequency synthesizer output signal is accomplished with minimum degradation of the fundamental waveform of the output signal. This is accomplished by providing dither waveform representing a band limited waveform. The dither waveform is summed with a modulation data word, if any, prior to application of the summation thereof to the periodic wave function converter so that the output signal becomes modulated by both the dither and the modulation data, if any, providing a dither modulated analog output signal. A sample dither signal corresponding with the dither waveform is combined at some point following the frequency synthesis process with the dither modulated analog output signal in such a manner that the dither is cancelled from the fundamental waveform of the analog output signal.

BRIEF DESCRIPTION OF THE DRAWINGS

The foregoing and other advantages of the invention will become more readily apparent from the following description of the preferred embodiment of the invention as taken in conjunction with the accompanying drawings, which are a part hereof, and wherein.

DESCRIPTION OF PREFERRED EMBODIMENT

Figures 1, 2:
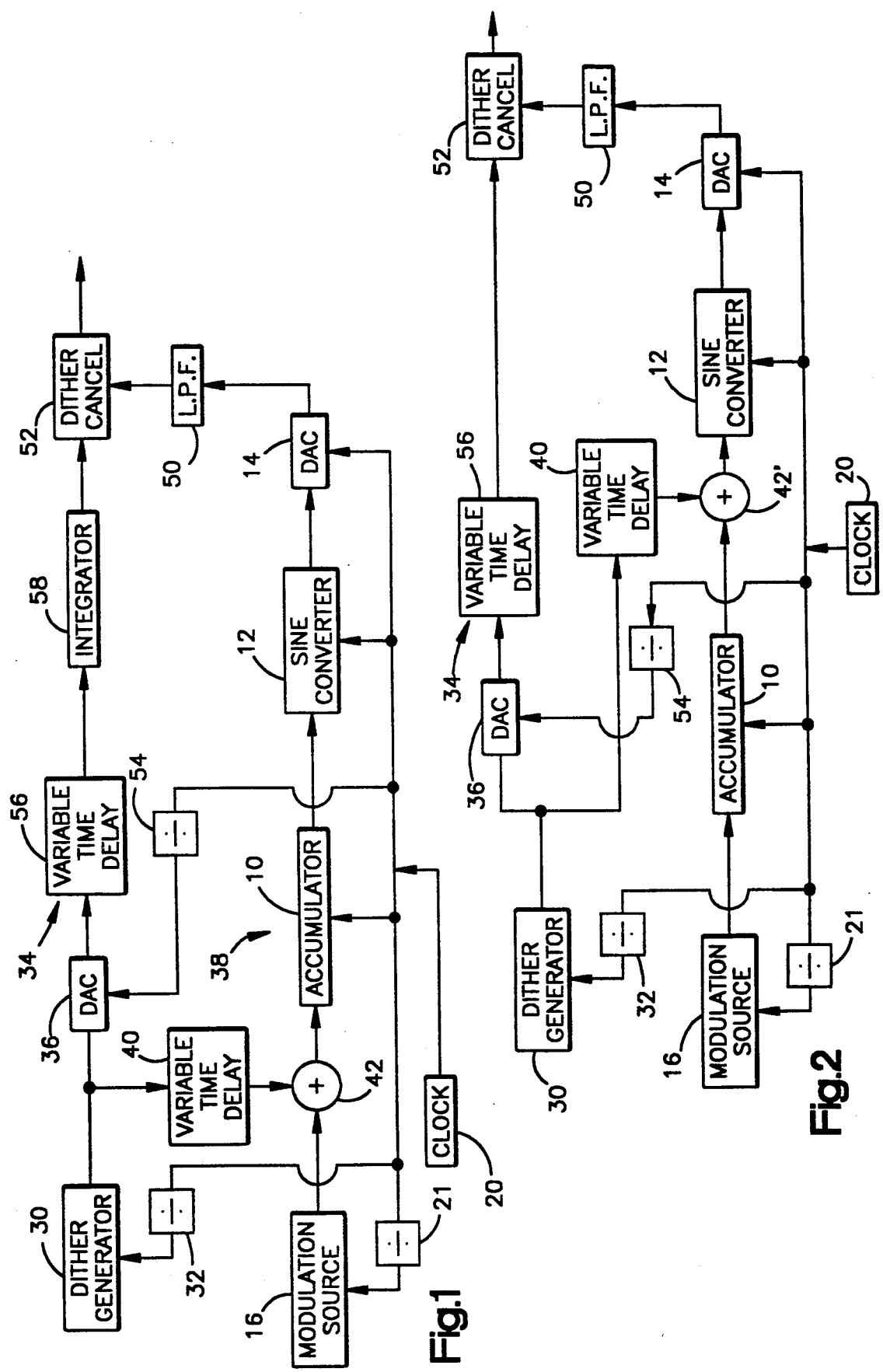
FIG. 1 is a schematic-block diagram illustration of one embodiment of the invention.
FIG. 2 is a schematic-block diagram illustration of a second embodiment of the invention.

Reference is now made to the drawings wherein the showings are for purposes of illustrating preferred embodiments of the invention only and not for purposes of limiting same. FIG. 1 discloses circuitry which is directed toward frequency dithering whereas the circuitry of FIG. 2, to be described in detail hereinafter, is directed toward phase dithering.

The circuitry of FIG. 1 includes a direct digital synthesizer (DDS). The DDS frequency synthesizer of FIG. 1 includes a phase accumulator 10, a periodic wave function converter taking the form of a sine converter 12 and a digital-to-analog converter (DAC) 14. Such frequency synthesizers are known and serve, for example, to generate an analog modulated signal which appears at the output of the DAC 14. In such a circuit a modulation source 16, which may take the form of a computer or the like, supplies a waveform pattern taking the form of multibit modulation data words which represent a particular waveform for the desired output signal. The signal could be a fixed value representing a tone output. These modulation data words are periodically supplied to the phase accumulator 10. The data stored in the accumulator is supplied at a predetermined clock rate from a clock 20 to a sine converter 12 for conversion into digital waveform data words, in a known manner. These waveform data words are transferred at the clock rate to a DAC 14 for conversion into the desired analog output signal. The modulation data words may be supplied by the modulation source at a somewhat slower clock rate, as by including a divider 21.

A disadvantage of the circuitry described thus far is that the output signal obtained from the DAC 14 contains spurious frequency components produced by the nonlinearity of the DDS frequency synthesizer including those that take place in the DAC 14. As will be brought out hereinafter, the present invention provides reduction of the spurious frequency component with minimum degradation of the fundamental waveform. The invention employs either phase or frequency dithering, as opposed to amplitude dithering of the prior art. Moreover, the waveform of the dithering is band limited in such a manner that eventual cancellation of the dither waveform from the fundamental waveform of the desired output signal may be obtained. This provides minimum degradation of the desired output signal. The dither cancellation, to be brought out hereinafter, is accomplished only on the fundamental waveform since it is a linear process. Dither on higher order products of the desired signal caused by nonlinearities will remain intact, thereby allowing reduced spurious amplitudes.

The dither source may be analog or digital, although it is shown as a digital generator in the drawings herein. The digital dither signal in the form of periodically provided multibit digital dither words are supplied by the dither generator to an upper analog path 34 by means of a DAC 36 and to a lower digital path 38 by means of a variable time delay 40. The digital data words are summed with the modulation data words by means of a summing device 42 with the summation thereof being supplied to the phase accumulator 10. This results in the output signal from the DAC 14 being modulated by the dither signal providing a dither modulated analog output signal. This dither modulated analog output signal is applied to a low pass filter 50. Filter 50 is typically a low pass filter set at the Nyquist frequency of one-half the clock frequency. However, the type and specifications can be arbitrary. The low pass filter output signal is then supplied to a dither cancellation circuit 52 to be discussed below.

In the upper path 34, the output of the digital-to-analog converter 36 serves as a sample dither signal corresponding with the dither provided by the dither generator 30. The conversion time of the DAC can be any multiple of the clock by using a suitable divider 54. Both the lower and upper paths include variable time delays 40 and 56, respectively. These time delays are adjusted to allow proper phasing of the signals for optimal cancellation. The delays could be introduced at any point before the cancellation block. Dither amplitude is equalized in both paths and this is accomplished by adjusting the gain of the DACs 14 and 36, or any other gain adjustment means, in a known manner. The delay of the bottom path 38 relative to the upper path 34 is adjusted so as to be ±180° in order to achieve the desired dither cancellation in the cancellation circuit 52. The amount of dither cancellation relative to phase can be approximated by the following formula:

$$Cancellation = 20 LOG[Sin(\phi)] dB \quad (1)$$

Wherein $\phi$ is the amount of phase variation from 180°. With temperature tracking, dither can be cancelled in excess of 60 dB. This allows for large dither signals to be used allowing better spurious spreading or suppression.

The dither from the dither generator can be summed into the DDS frequency synthesizer before or after the phase accumulator. In the circuit of FIG. 1, the dither is inserted into the DDS frequency synthesizer before the accumulator 10. This is considered as frequency dithering and, in this case, an integrator 58 is employed in the upper path between the variable time delay 56 and the dither cancellation circuit 52. The circuitry shown in the embodiment of FIG. 2 differs from that of FIG. 1 in that the dither is summed into the DDS frequency synthesizer after the accumulator and before the sine converter 12 by means of the summation circuit 42'. This is considered as phase dithering and the circuit does not require the integrator 58 of FIG. 1. Otherwise, the circuits of FIGS. 1 and 2 are identical and, for this reason, like character references are used on both the figures to identify like components.

As noted above, the dither signal is summed into the input or output of the accumulator in the DDS frequency synthesizer creating modulation of the original signal. The modulation tends to spread the spurious components over a limited dither frequency band. In accordance with the invention, a sample of the dither waveform can be obtained and combined with the dither modulated analog output signal obtained from the DDS frequency synthesizer with the combining taking place in such a manner that the dither signal is cancelled from the fundamental waveform of the analog output signal thereby reducing the spurious frequency components while minimizing the degradation of the fundamental waveform. The cancellation circuitry does not cancel the dither on the higher order products of the desired output frequency signal caused by nonlinearity and, hence, this dither will remain intact permitting reduced spurious amplitudes.

Figure 3:
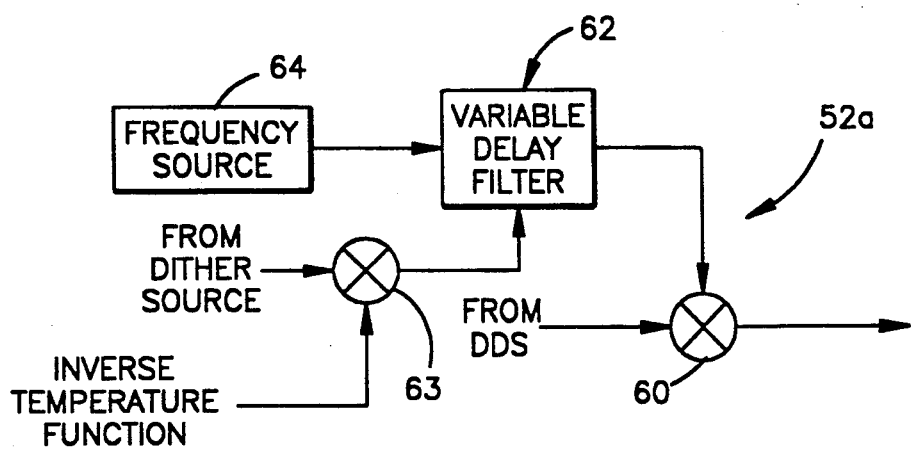
FIG. 3 is a schematic-block diagram illustration of a dither cancellation circuit in accordance with one embodiment of the invention and which may be used with the circuitry of either FIGS. 1 or 2.
Figure 4:
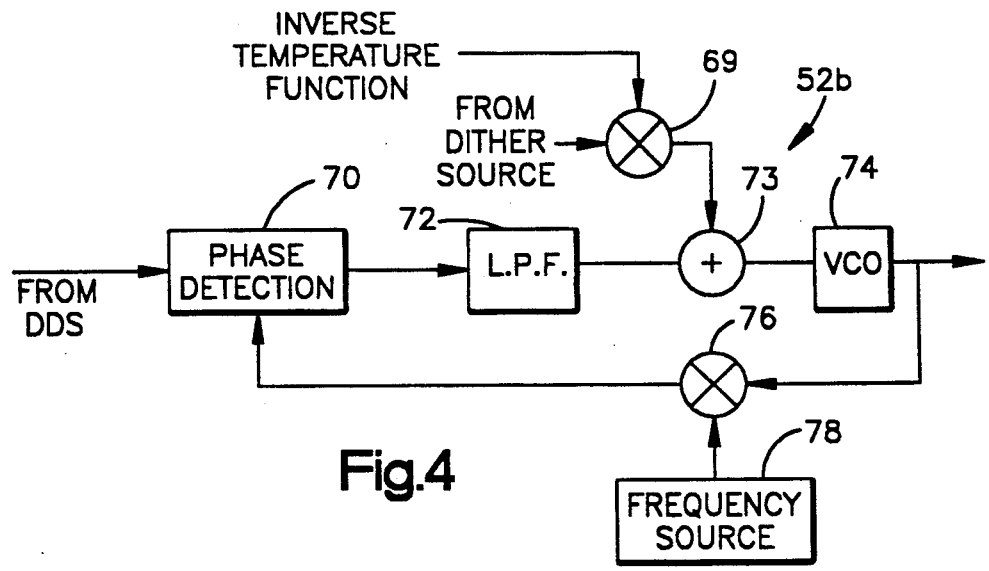
FIG. 4 is a schematic-block diagram illustration of another embodiment of a dither cancellation circuit in accordance with the invention and which may be used with the circuitry of FIG. 1.

Whereas various dither cancellation circuits may be employed in accordance with the invention, two illustrative circuits are presented herein in FIGS. 3 and 4. The dither circuit 52A of FIG. 3 is simpler than that of the dither cancellation circuits 52B and 52C shown in FIG. 4 and FIG. 5. The circuit of FIG. 3 requires only a mixer 60 and a variable delay filter 62 receiving input signal from a frequency source 64 and, optionally, for more robust dither waveforms, a dither multiplier 63 that scales the dither to compensate for temperature variations. The scaling is inversely proportional to the modulation index of the filter 62 over temperature. The variable delay filter can easily be implemented with a varactor, and other standard filter elements. A simplistic mathematical model can be used to describe the cancellation process, if no modulation or temperature effects are assumed. The input signal from DDS frequency synthesizer at the output of the low pass filter 50 is described by the following formula:

$$A\cos[\omega_c t + \beta f(t)] \quad (2)$$

Wherein A is the carrier amplitude in volts, $\omega_c$ is the center frequency in radians, f(t) is the dither waveform and $\beta$ is the dither amplitude. Nonlinearities in the DDS and DAC process generate harmonic components of the fundamental waveform. The signal is given by the following formula:

$$A_1\cos[\omega_c t + \beta f(t)] + A_2\cos[2\omega_c t + 2\beta f(t)] + A_3\cos[3\omega_c t + 3\beta f(t)] + \ldots \quad (3)$$

The input from the dither signal source is taken from the output of the integrator 58 in FIG. 1 or from the variable time delay in FIG. 2. The input is simply the dither waveform given by the following formula:

$$A_d f(t) \quad (4)$$

A frequency source 64 provides a frequency signal, for example 10 MHz, as a fixed frequency which is supplied to the variable delay filter 62 which may include a varactor and other associated filter circuitry. As the dither voltage changes, the phase of the frequency source 64 is changed proportionately. The amplitude of the dither waveform is adjusted to allow for a frequency change so that the phase change is equal and opposite the dithered waveform from the synthesizer. The dither amplitude $A_d$ is made to equal $\beta$ when applied to the variable delay filter. Thus, the signal provided by the variable delay filter should be in accordance with the following formula:

$$A_f\cos[\omega_o t - \beta f(t)] \quad (5)$$

Wherein $A_f$ is the amplitude of the signal in volts, $\omega_o$ is the center frequency in radians, and $\beta f(t)$ is the optimized dither cancellation signal. The mixer multiplies the two signals (equation (3) and equation (5)) above. Considering only the upper side band of the mixing process, the resulting signal is:

$$\begin{aligned} &K_1\cos\{(\omega_c + \omega_o)t + [\beta f(t) - \beta f(t)]\} + \\ &K_2\cos\{(2\omega_c + \omega_o)t + [2\beta f(t) - \beta f(t)]\} + \\ &K_3\cos\{(3\omega_c + \omega_o)t + [3\beta f(t) - \beta f(t)]\} + \ldots \end{aligned} \quad (6)$$

Note that the two dither terms associated with the fundamental signal and shown in square brackets cancel. K is a constant. This eliminates degradation of the desired fundamental signal. All other dither products remain allowing spurious suppression of all products caused by nonlinearities. Not only do they remain but the amount of spreading or smearing is increased proportionally relative to the harmonic order. A similar type analysis could be done for an arbitrarily modulated signal.

Figure 5:
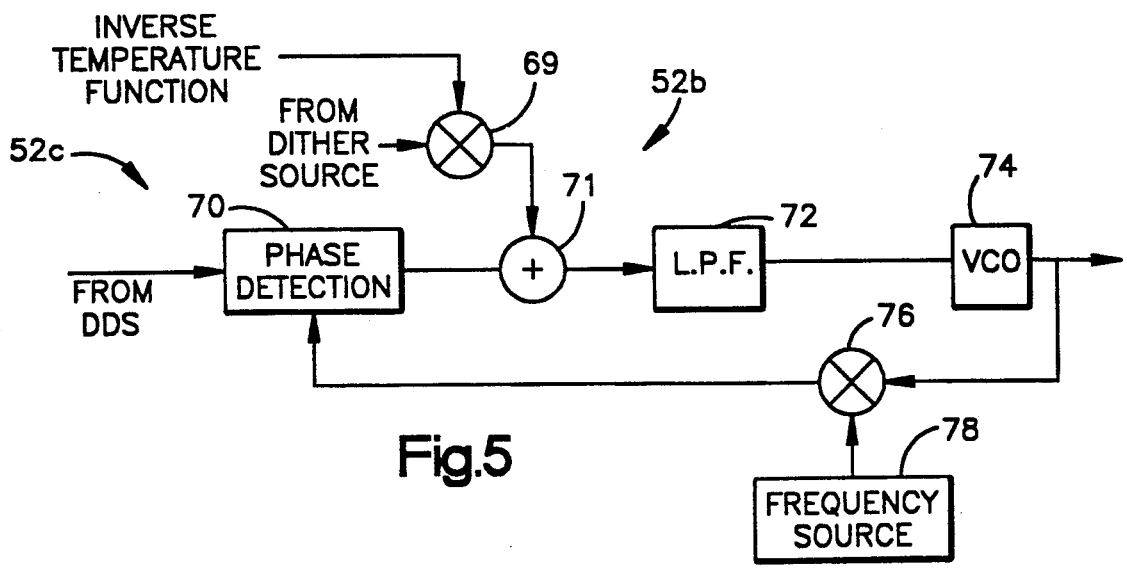
FIG. 5 is a schematic-block diagram illustration similar to FIG. 4 and which may be used with the circuitry of FIG. 2.

Reference is now made to the dither cancellation circuits 52B and 52C illustrated in FIG. 4 and FIG. 5. FIG. 4 includes a phase lock loop including a phase detector 70 that receives the dither modulated output frequency signal from the DDS and specifically from the output of the low pass filter 50 in FIG. 1. The output of the phase detector 70 is supplied through a low pass filter 72 and summed at a summing device 73 with the frequency modulated dither.

Reference is now made to FIG. 5 which is used with the phase modulated dither of FIG. 2. The output of the phase detector 70 is summed with a summing device 71 with the phase modulated dither signal (From FIG. 2).

The output of the variable time delay circuit 56 in FIG. 2 can be scaled (by multiplier 69) by an inverse temperature factor to allow superior amplitude tracking and consequent dither cancellation. The result of this summation is applied to a voltage control oscillator (VCO) 74. The output of the VCO is applied to one input of the phase detector 70 by a feedback path to provide a typical phase lock loop (PLL) circuit. The feedback path may include a mixer 76 having one input obtained from the VCO 74 and a second input obtained from a frequency source 78 so that, for example, an up-conversion may be achieved.

The input to the phase detector 70 from the DDS frequency synthesizer is as described before, either a phase or frequency modulated dither waveform. The other input to the phase detector is obtained from the mixer 76. The phase detector 70 measures the relative phase between these two inputs and produces a voltage proportional to the phase difference. The output of the phase detector will necessarily include the dither waveform, due to the dither modulated signal from the low pass filter 50 of FIG. 2. The signal from the phase detector is then filtered by the low pass filter 72 and added to the dither signal (if frequency modulated dither is used, see FIG. 1) by means of the summing device 73 interposed between the low pass filter 72 and the VCO 74. If phase modulated dither is used (FIG. 2) then the dither is summed after the phase detector 70 but before the filter 72. The dither signal must pass through the low pass filter 72 unattenuated. This is ultimately the limiting factor on the dither bandwidth or conversely, the dither bandwidth will determine the minimum bandwidth. The dither source signal's amplitude is adjusted so that the dither source signal equals the dither signal provided by the phase detector 70 and low pass filter 72 of FIG. 4. The amplitude can also be scaled by an inverse temperature factor which is derived from the temperature drift of the phase detector 70. This allows more robust dither to be used since temperature tracking ensures better amplitude tracking. The dither source signal's phase is also adjusted to be 180° from same said signal. The summation of these signals takes place at the summing device 73 wherein the signals are summed to provide the necessary cancellation of the fundamental dither waveform. This dither voltage is cancelled and applied to the VCO 74 which, then, reproduces the DDS frequency signal with the dither cancelled from the fundamental waveform.

Although the invention has been described in conjunction with preferred embodiments, it is to be appreciated that various modifications may be made without departing from the spirit and scope of the invention as defined by the appended claims.

Having described the invention, the following is claimed:

1. A direct digital synthesizer for providing an analog output signal and apparatus for reducing spurious frequency components from said output signal of said direct digital synthesizer with minimum degradation of the fundamental waveform of said output signal and wherein said synthesizer has a phase accumulator for receiving digital multibit data words and providing output data words, a wave function converter for converting data words into multibit digital waveform data words and a digital-to-analog converter for converting the digital waveform data words into said output signal and which exhibits a frequency and waveform dictated by the digital modulation data words and wherein the output signal contains spurious frequency components resulting from the operation of the direct digital synthesizer, said reducing apparatus comprising:

means for generating a dither waveform representing a band limited waveform;

means for summing said dither waveform with a data word and providing a summation data word prior to application thereof to said periodic wave function converter so that said output signal becomes modulated by said dither waveform providing a dither modulated analog output signal;

means for providing a sample dither signal corresponding with said dither waveform; and means for combining said sample dither signal and said dither modulated analog output signal in such a manner that said dither waveform is cancelled from the fundamental waveform of the analog output signal.

2. A direct digital synthesizer as set forth in claim 1 wherein said means for generating said dither waveform includes an addressable memory for generating multibit digital dither words.

3. A direct digital synthesizer as set forth in claim 2 wherein said means for providing a sample dither signal includes a digital-to-analog converter for converting said generated digital data words into a sample analog dither signal.

4. A direct digital synthesizer as set forth in claim 3 wherein said means for combining includes a dither cancellation circuit including phase adjusting means for receiving said sample dither signal and shifting same by 180° and mixer means for receiving said phase shifted dither signal together with said dither modulated analog output signal for providing a said output signal wherein said dither waveform has been cancelled from the fundamental waveform.

5. A direct digital synthesizer as set forth in claim 4 including a frequency source for providing a fixed frequency signal to said phase shifting means along with said sample dither signal so that both said signals are shifted in phase by 180° prior to application to said mixing means.

6. A direct digital synthesizer as set forth in claim 3 wherein said means for combining includes a phase lock loop circuit including a phase detector for receiving said dither modulated analog output signal.

7. A direct digital synthesizer as set forth in claim 6 including a first low pass filtering means interposed between said direct digital synthesizer and said phase detector.

8. A direct digital synthesizer as set forth in claim 6 wherein said phase lock loop includes a voltage controlled oscillator for providing a frequency signal dependent upon an input voltage signal applied thereto, said phase detector means in said phase lock loop having means for receiving the frequency signal provided by said voltage controlled oscillator and the dither modulated analog output signal from the direct digital synthesizer and providing an output signal having a magnitude that varies in proportion to the phase difference between said received signals.

9. A direct digital synthesizer as set forth in claim 8 including a second low pass filtering means for receiving the output signal from said phase detecting means and providing a filtered output signal.

10. A direct digital synthesizer as set forth in claim 9 including summing means for summing said filtered output signal from said second low pass filtering means with said sample dither signal to provide a resultant signal which is then supplied to the voltage controlled oscillator as said input voltage signal for reproducing the output signal of the direct digital synthesizer such that the dither waveform is cancelled from the fundamental waveform of the analog output signal.

11. A direct digital synthesizer as set forth in claim 1 wherein said means for summing is interposed between said accumulator and said wave function converter for effecting phase dithering.

12. A direct digital synthesizer as set forth in claim 1 wherein said means for summing is interposed between said generating means and said accumulator for effecting frequency dithering.

13. A direct digital synthesizer as set forth in claim 12 wherein said means for providing a sample dither signal includes a digital-to-analog converter for providing an analog dither signal.

14. A direct digital synthesizer as set forth in claim 13 including integrator means interposed between said digital-to-analog converter and said means for combining.

15. A direct digital synthesizer as set forth in claim 1, including means for scaling the dither waveform to compensate for temperature drift of said apparatus.

16. Apparatus for reducing spurious frequency components from the output signal of a direct digital synthesizer with minimum degradation of the fundamental waveform of the output signal and wherein said synthesizer has a phase accumulator for receiving digital multibit modulation data words from a source and providing output data words, a wave function converter for converting said output data words into multibit digital waveform data words and a digital-to-analog converter for converting the digital waveform data words into said output signal and which exhibits a frequency and waveform dictated by the digital modulation data words and wherein the output signal contains spurious frequency components resulting from the operation of the direct digital synthesizer, said reducing apparatus comprising:

means for generating a dither waveform representing a band limited waveform;

means for summing said dither waveform with a said modulation data word prior to application of the summation thereof to said accumulator so that said output signal becomes modulated by said dither waveform providing a dither modulated analog output signal;

means for providing a sample dither signal corresponding with said dither waveform; and means for combining said sample dither signal and said dither modulated analog output signal in such a manner that said dither waveform is cancelled from the fundamental waveform of the analog output signal.

17. Apparatus for reducing spurious frequency components from the output signal of a direct digital synthesizer with minimum degradation of the fundamental waveform of the output signal and wherein said synthesizer has a phase accumulator for receiving digital multibit data words and providing output data words, a wave function converter for converting data words into multibit digital waveform data words and a digital-to-analog converter for converting the digital waveform data words into said output signal and which exhibits a frequency and waveform dictated by the digital modulation data words and wherein the output signal contains spurious frequency components resulting from the operation of the direct digital synthesizer, said reducing apparatus comprising:

means for generating a dither waveform representing a band limited waveform;

means for summing said dither waveform with a data word and providing a summation data word prior to application thereof to said periodic wave function converter so that said output signal becomes modulated by said dither waveform providing a dither modulated analog output signal;

means for providing a sample dither signal corresponding with said dither waveform; and means for combining said sample dither signal and said dither modulated analog output signal in such a manner that said dither waveform is cancelled from the fundamental waveform of the analog output signal.

* * * * *